United States Patent [19]

Webb et al.

[11] Patent Number: 4,821,174

[45] Date of Patent: Apr. 11, 1989

[54] SIGNAL PROCESSING SYSTEM INCLUDING A BUS CONTROL MODULE

[75] Inventors: Richard F. Webb, Baltimore, Md.; Charles W. Brooks, Jr., Wayland, Mass.

[73] Assignee: Westinghouse Electric Corp., Pittsburgh, Pa.

[21] Appl. No.: 211,126

[22] Filed: Jun. 21, 1988

Related U.S. Application Data

[63] Continuation of Ser. No. 591,361, Mar. 20, 1984, abandoned.

[51] Int. Cl.$^4$ .............................................. G06F 13/00
[52] U.S. Cl. ...................................... 364/200; 370/88
[58] Field of Search ... 364/200 MS File, 900 MS File; 370/80, 84, 86, 88

[56] References Cited

U.S. PATENT DOCUMENTS

| | | | |
|---|---|---|---|
| 3,699,523 | 10/1972 | Percher | 364/200 |
| 3,732,543 | 5/1973 | Rocher et al. | 370/88 |
| 3,883,693 | 5/1975 | Moore | 370/88 |
| 3,919,483 | 11/1975 | Gindi et al. | 364/200 |
| 3,997,896 | 12/1976 | Cassarino et al. | 364/200 |
| 4,002,842 | 1/1977 | Meyr et al. | 370/86 |
| 4,099,233 | 7/1978 | Barbagelata et al. | 364/200 |
| 4,130,865 | 12/1978 | Heart et al. | 364/200 |
| 4,133,030 | 1/1979 | Huettner et al. | 364/200 |
| 4,188,665 | 2/1980 | Nagel et al. | 364/200 |
| 4,195,351 | 3/1980 | Barner et al. | 364/900 |
| 4,227,178 | 10/1980 | Gergaud et al. | 340/147 |
| 4,228,496 | 10/1980 | Katzman et al. | 364/200 |
| 4,250,547 | 2/1981 | Matsumoto | 364/200 |
| 4,300,194 | 11/1981 | Brodley et al. | 364/200 |
| 4,335,426 | 6/1982 | Maxwell et al. | 364/200 |
| 4,402,046 | 8/1983 | Cox et al. | 364/200 |
| 4,432,054 | 2/1984 | Okada et al. | 364/200 |
| 4,456,965 | 6/1984 | Grober et al | 364/900 |
| 4,459,665 | 7/1984 | Mio et al. | 369/200 |
| 4,489,379 | 12/1984 | Lanier et al. | 364/200 |
| 4,594,653 | 6/1986 | Iwashita et al. | 364/200 |

OTHER PUBLICATIONS

"Single-Board Intelligent Controller . . . ", Computer Design-Dec. 1978.

Primary Examiner—Gary V. Harkcom
Assistant Examiner—Randy W. Lacasse
Attorney, Agent, or Firm—W. G. Sutcliff

[57] ABSTRACT

A signal processing system that includes a ring bus; a multiplicity of system modules, each coupled to the ring bus and operative to receive and transfer blocks of data words over the ring bus; and a bus control module coupled to the ring bus and operative to support simultaneous data transfers between specified pairs of system modules in accordance with concurrent execution of multiple programs of data transfer instructions. In an alternate embodiment, the signal processing system may include a plurality of ring buses wherein each system module is coupled to all of the ring buses and operative to receive and transfer blocks of data words over any one of the ring buses. In addition, the bus control module is also coupled to all of the ring buses and operative to support simultaneous data transfers between specified pairs of system modules over all of the ring buses. Moreover, each ring bus may comprise individual bus segments for system module to system module coupling about the ring.

8 Claims, 6 Drawing Sheets

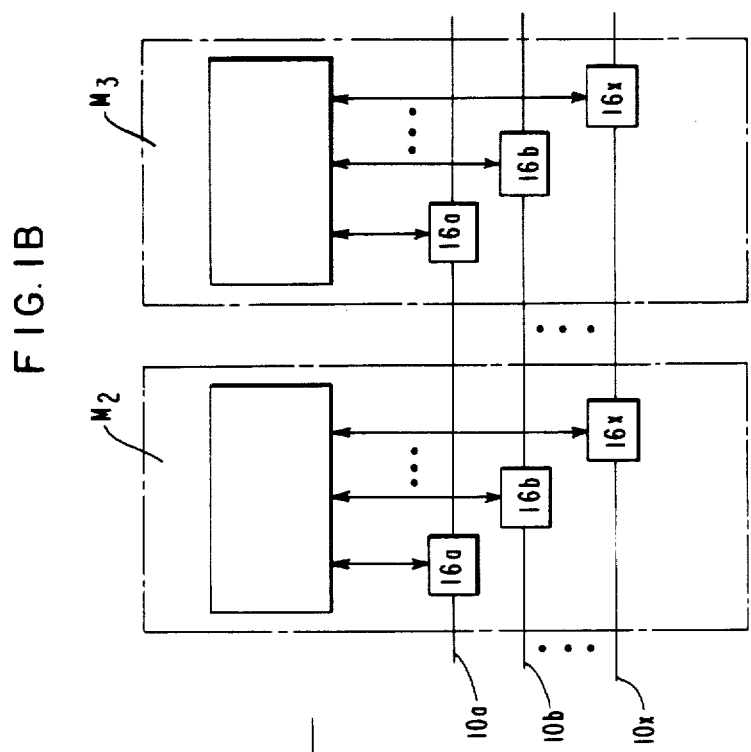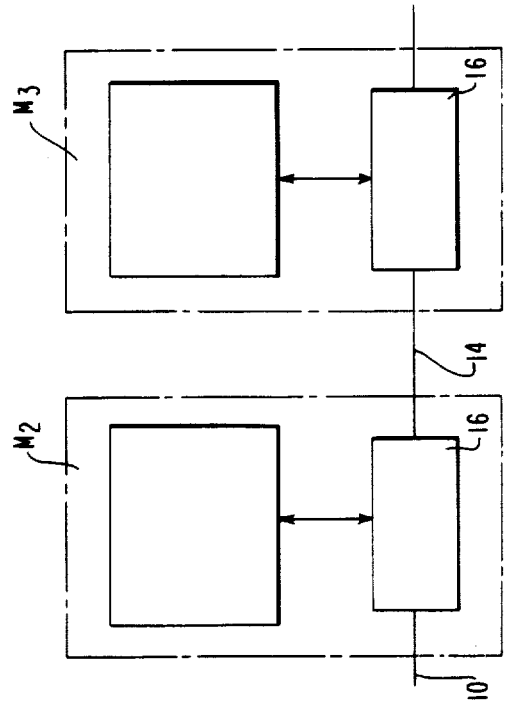

SIGNAL PROCESSING SYSTEM INCLUDING A BUS CONTROL MODULE

This application is a continuation of application Ser. No. 06/591,361 filed Mar. 20, 1984, now abandoned.

BACKGROUND OF THE INVENTION

The present invention relates to signal processing systems, in general, and more particularly to a processing system including a bus control module operative to support simultaneous data transfers between specified pairs of system modules coupled to a ring bus in accordance with concurrent execution of multiple programs of data transfer instructions.

Modern signal processing systems are comprised of a plurality of system modules which may have different performance levels as well as different sizes. The term "module" refers to a hardware combination that performs a significant function in the processing system. A signal processing system generally includes modules of the following classes:

(1) modules which facilitate input or output of data into the system;

(2) modules which are used for data retention and their associated access controls;

(3) processing modules which can be grouped in the same class regardless of the processing domain or manner in which the processing is achieved; and (4) modules which provide a protocol for and control the data flow and exchange of information among the other modules.

Typically, a signal processing system comprises different combinations of the above classes of system modules. In order to satisfy signal processing requirements for a given application, a system configuration of the system modules is chosen which is best suited for the given application. Accordingly, a highly reconfigurable system architecture will allow for a great deal of flexibility.

The class (4) system module is considered essential to achieving the desired reconfigurable modular system architecture. System modules of this class may be referred to as bus control modules because they provide the control for high speed data transfers between all the other modules over a data bus. Modern multiple processor signal processing systems may at times have total processing capabilities large enough to exceed the capability of a data bus with a fixed transfer rate. Therefore, modular bus bandwidth as supported by a bus control module is fundamental to realizing a balanced multiprocessing system architecture. An embodiment of a bus control module suitable for this purpose is described herebelow.

SUMMARY OF THE INVENTION

A signal processing system includes a ring bus, a multiplicity of system modules operative to receive and transfer blocks of data words over the ring bus; and a bus control module coupled to the ring bus and operative to support simultaneous data transfers between specified pairs of system modules in accordance with concurrent execution of multiple programs of data transfer instructions. The ring bus comprises individual bus segments for system module to system module coupling about the ring.

More specifically, the bus control module comprises first and second memory means and associated first and second control means. The first memory means stores a plurality of programs wherein each program includes a sequence of data transfer instructions, each instruction specifying the pair of system modules corresponding to the instructed data transfer thereof. The second memory means stores a predetermined number of data transfer instructions of each program of the first memory means. Each stored instruction of the second memory is preassigned an execution priority. The first control means is operative to execute the data transfer instructions of the second memory means based on a number of factors including the execution priority of the instruction, the transfer readiness of the pair of system modules specified by the instruction, and the bus activity between the specified module pair. Finally, the second control means is operative to replace data transfer instructions of the second memory means upon the execution thereof with data transfer instructions of the first memory means, which replacement instructions being fetched from corresponding programs in accordance with the sequence of data transfer instructions within the programs.

In accordance with another aspect of the present invention, the processing system includes a plurality of ring buses wherein each system module is coupled to all of the ring buses and operative to receive and transfer blocks of data words over any one of the ring buses. The bus control module includes a bus interfacing means and a bus activity monitor for each ring bus. Each interfacing means couples the bus control module to its associated ring bus and is operative to convert an executable instruction to address and command information specified thereby and to transfer the converted information over its associated ring bus to the corresponding pair of system modules to initiate data transfer therebetween over the associated ring bus. Each bus activity monitor stores instructions during the execution thereof to render the status of the bus activity over its associated ring bus. In addition, the first control means includes means for transferring an executable instruction to the pair of bus interfacing means and bus activity monitor corresponding to a selected ring bus over which the instructed transfer has been determined to occur.

In one embodiment, each system module includes means for generating signals representative of its source and destination conditions with regard to data transfer readiness. Moreover, the first control means determines an executable instruction from the instructions accessed from the second memory means based on the execution priority codes thereof, the source and destination condition signals from the system module specified thereby and the current bus activity status as rendered by the bus activity monitors. One of the ring buses for the instructed data transfer of the determined executable instruction is selected based on the current bus activity status as rendered by the bus activity monitors and the determined executable instruction is transferred to the pair of bus interfacing means and bus activity monitor corresponding to the selected ring bus.

In accordance with still another aspect of the present invention, the first control means may identify an instruction which would be executable except for a conflict of its instructed data transfer with the current bus activity of all of the ring buses. Under these conditions, the execution of a selected data transfer may be suspended based on the priority codes of its corresponding instruction and the identified instruction may be executed in place of the selected instruction. Execution of the selected instruction may be resumed in accordance with the status of the bus activity as rendered by the bus activity monitor.

BRIEF DESCRIPTION OF THE DRAWINGS

FIG. 1 is a block diagram schematic illustrating a simple signal processing system suitable for embodying the principles of the present invention.

FIGS. 1A and 1B are block diagram schematics illustrating alternate embodiments for system module to system module interconnections suitable for use in the embodiment of FIG. 1.

DESCRIPTION OF THE PREFERRED EMBODIMENT

Figure 2:
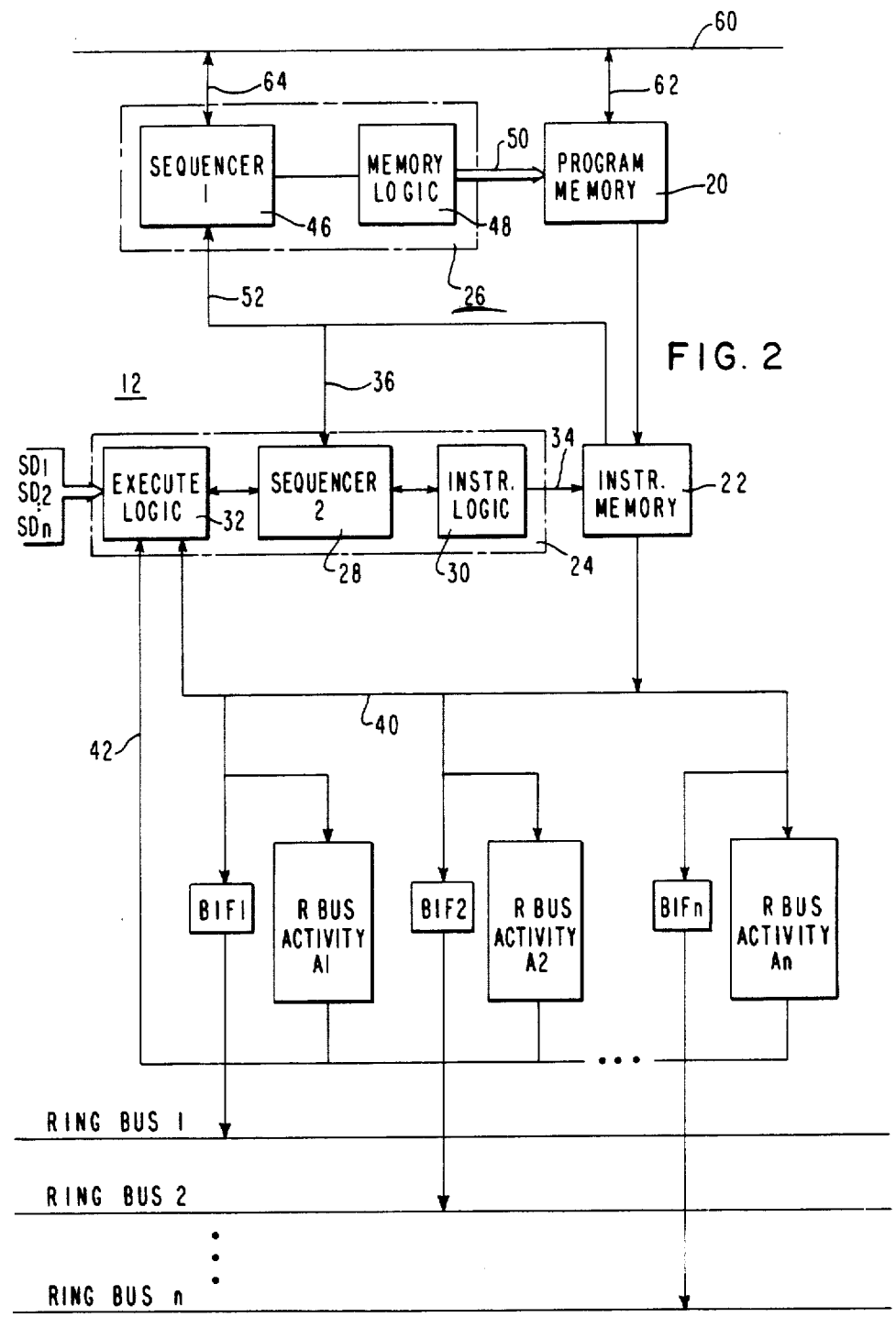
FIG. 2 is a block diagram schematic of a bus control module suitable for use in the embodiment of FIG. 1.

The block diagram schematic of FIG. 1 illustrates a simple signal processing system which is suitable for embodying the principles of the present invention. Referring to FIG. 1, the signal processing system includes a ring bus 10, a multiplicity of system modules M1, M2, ... Mn, and a bus control module 12. The ring bus 10 comprises individual bus segments 14 for system module to system module coupling about the ring. The system modules M1 through Mn are operative to receive and transfer blocks of data words over the ring bus 10 and to generate signals SD1, SD2, ..., SDn representative of their corresponding source and destination availability status. The bus control module 12 is coupled to the ring bus 10 and is operative to support simultaneous data transfers between specified pairs of system modules in accordance with concurrent execution of multiple programs of data transfer instructions. The bus control module 12 relies on the status of the source and destination signals SD1, SD2, ..., SDn supplied thereto from the corresponding system modules M1, M2, ..., Mn to make decisions related to bus transfers. The bus control module 12 will be described in greater detail herebelow.

In one embodiment, the ring bus 10 may include a single ring bus in which case each of the system modules may be coupled to the single ring bus 10 through corresponding network interface units included therein. This configuration is exemplified in the diagram of FIG. 1A. In another embodiment, the ring bus 10 may comprise a plurality of ring buses 10a, 10b, ... 10x such as that shown in the configuration example of FIG. 1B. In this example, each system module Mi may include as many network interface units 16a, 16b, ..., 16x as there are ring buses to effect the coupling of each system module to all of the ring buses wherein each system module is operative to receive and transfer blocks of data words over any one of ring buses 10a, 10b, ... 10x.

The ring bus 10 is a high frequency bus which permits system modularity and reconfigurability as demonstrated by the block diagram schematic of FIG. 1. Processing modularity is achieved because the ring bus allows a way for interconnecting the system modules so that processing may be distributed among these interconnected modules. Bus bandwidth requirements are generally dependent on how many and what class of system modules are interconnected together. Accordingly, the bus control module 12 governs both bus bandwidth modularity and reconfigurability. Bus throughput modularity is achieved by the bus control module 12 because it can support a number of simultaneous transfers per ring bus as well as supporting multiple ring buses. The ring bus structure may be configured with as many buses having as many simultaneous transfers as is necessary to satisfy the bus bandwidth requirements for a given system configuration.

Around the ring bus 10, each system module electrical interconnection goes only to the next system module via bus segments 14. This system module to system module data transfer over the ring bus allows minimum propagation delay requirements to be met for much higher operational frequencies than would otherwise be possible. The ring bus 10 is preferred because it allows simultaneous transfers over different portions of the bus. For example, in a ring bus with a plurality of ring bus segments similar to the configuration described in connection with FIG. 1B, a transfer from any one system module to another system module would only use one of the ring buses. Thus, the other ring buses may be used for other transfers. This represents a maximum potential bandwidth corresponding to the number of simultaneous transfers possible on a ring bus times the number of ring buses times the bus frequency.

In the exemplified system of FIG. 1, the ring bus is a closed loop or "ring" comprised of a finite set of bus segments 14, each segment being tied to the next by a network interface unit 16 included in each of the system modules Mi as depicted in FIG. 1A or 1B. It is preferred that the data transfer flow in one direction around the ring for each ring bus. In addition, the ring bus architecture permits a balanced system to be achieved by allowing more modules to be added without saturating the bus wherein the system data transfer rate is not limited to the rate of the ring bus. This type of ring bus capability allows the concepts of concurrent and distributed processing to be utilized.

A suitable embodiment of a bus control module is depicted in the block diagram schematic of FIG. 2. Referring to FIG. 2, a program memory 20 is included for storing a plurality of programs. Each program includes a sequence of data transfer instructions wherein each instruction specifies the pair of system modules corresponding to the instructed data transfer thereof. A second memory 22, referred to as the pending instruction memory, is included for storing a predetermined number of data transfer instructions, say like two, for example, of each program of the memory 20. Each stored instruction of the memory 22 is preassigned an execution priority. A controller 24 is operative to execute the data transfer instructions of the memory 22 based on a number of factors including the execution priority of the instruction, the transfer readiness of the pair of system modules specified by the instruction, and the bus activity between the system module pair. Another controller 26 is operative to replace the data transfer instructions of the memory 22 upon the execution thereof with data transfer instructions of the program memory 20 fetched from corresponding programs in accordance with the sequence of data transfer instructions thereof.

The bus control module 12 further includes bus interface units BIF1, BIF2, . . . BIFn corresponding to the ring buses 1 through n for coupling the bus control module to each of the ring buses. Each bus interfacing unit BIFi is operative to convert an executable instruction to address and command information specified thereby and to transfer the converted information over the associated ring bus to the corresponding pair of system modules to initiate a data transfer therebetween. The bus control module 12 still further includes bus activity monitors A1, A2, . . . An corresponding to each bus interface unit for storing instructions during the execution thereof to render the status of the bus activity over its associated ring bus.

More specifically, the controller 24 includes a sequencer 28 which controls the operations of instruction logic 30 and execute logic 32. The instruction logic 30 may include one or more instruction counters for addressing the memory cells of the memory 22 via address lines 34. Various control codes of the stored instructions of memory 22 may be supplied to the sequencer 28 over signal lines 36. An internal bus 40 is utilized in the present embodiment for conducting data instructions accessed from the memory 22 to the various bus interface units and bus activity monitors and the execute logic 32. Moreover, the activity status generated by each of the bus activity monitors A1 through An is provided to the execute logic 32 over signal lines 42. The source and destination condition signals SD1, SD2, . . . , SDn generated from the corresponding system modules M1, M2, . . . , Mn coupled around the ring bus 10 are provided to the execute logic 32.

The controller 26 also includes a sequencer 46 for controlling a program memory logic block 48 which may be comprised of an instruction counter for each program of data transfer instructions stored in the program memory 20 wherein the outputs of the instruction counters are provided over signal lines 50, preferably in a multiplexed manner, to address the various portions of the program memory storing the corresponding programs. The instructions stored in the instruction memory 22 may also include various control codes.

The foregoing described configuration of a bus control module permits the execution of the plurality of programs stored in memory 20 in an interleaved fashion such that they will be in different stages of completion at any given time. The sequencers 28 and 46 may both include microprogrammed memory, the programs of which contain the sequential operational steps of the control pattern in each case.

Figure 3:
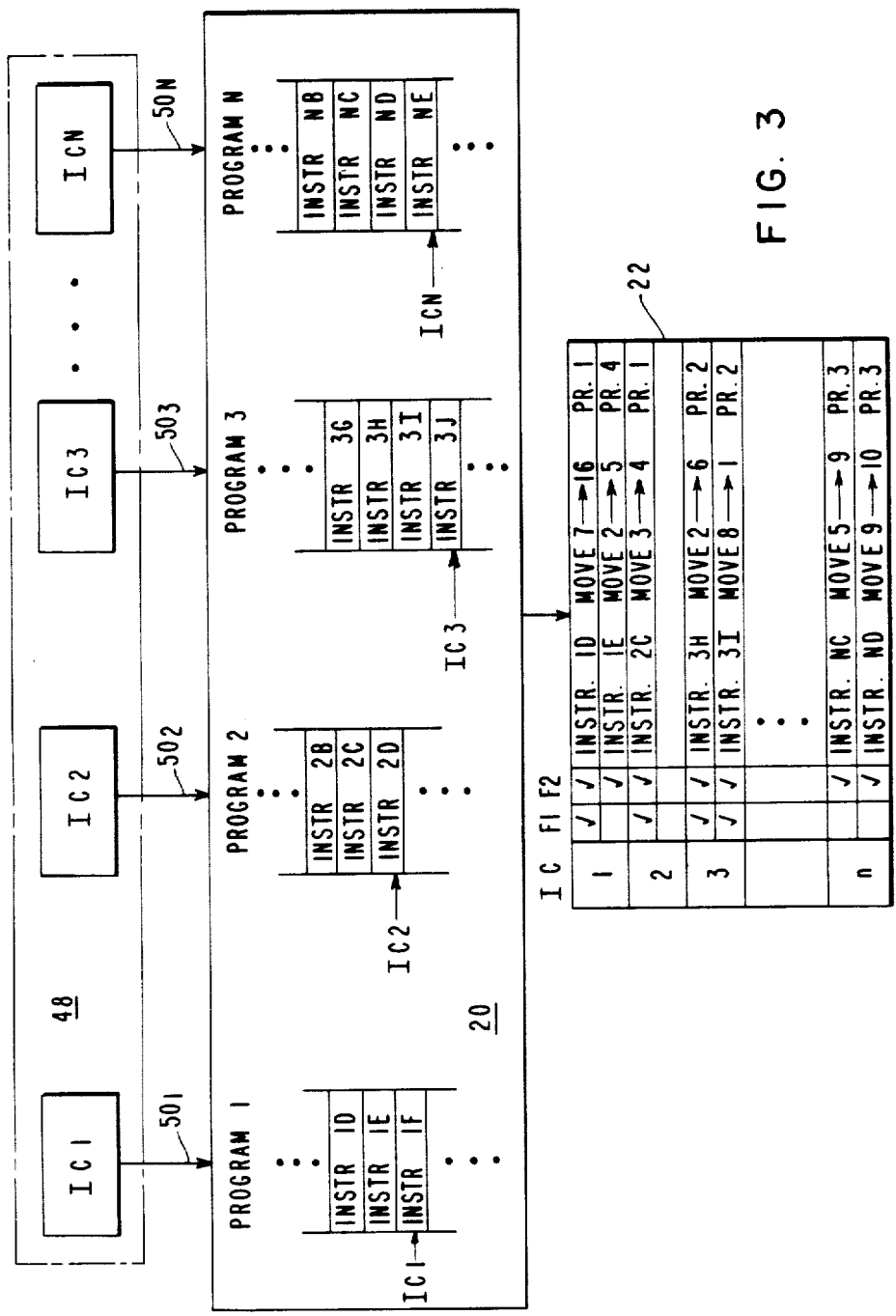
FIG. 3 is a block diagram illustration suitable for depicting the operation of a portion of the bus control module embodiment of FIG. 2.

An illustration depicting the operation of the memory logic block 48, program memory 20 and pending instruction memory 22 is shown in FIG. 3. The instruction counters IC1, IC2, . . . ICn of the logic block 48 may address their corresponding programs in the program memory 20 using their respectively corresponding addresses $50_1$, $50_2$, . . . $50_n$ which may be multiplexed over signal lines 50, for example. As described above, at any given point in time, the programs 1 through N may be in various executable states. For illustration purposes, the arrowed pointers corresponding to each of the programs in the memory 20 represent the present address codes of the instruction counter respectively associated therewith.

The illustrated pending instruction memory 22 of FIG. 3 depicts two memory locations available for each program of memory 20 identified by an address label, denoted as IC. Control bits F1 and F2 may be provided with each pending instruction in the memory 22. The F2 control bits represent the condition in which an accessed instruction from the memory 20 is residing in the designated location in the memory 22. The F2 control bits may be monitored by the sequencer 46 over signal lines 52 (see FIG. 2) as an aid in determining the next instruction to be accessed from the program memory 20. The F1 control bits represent the condition in which the transfer corresponding to the instruction residing in that location is active on the bus, i.e. being executed. The F1 and F2 control bits may be monitored by the sequencer 28 over signal lines 36 as an aid in determining when and what transfers should be taking place. Note that in the present embodiment, each instruction in the memory 22 also includes a priority code ranging from PR1 through PR4.

Figure 4:
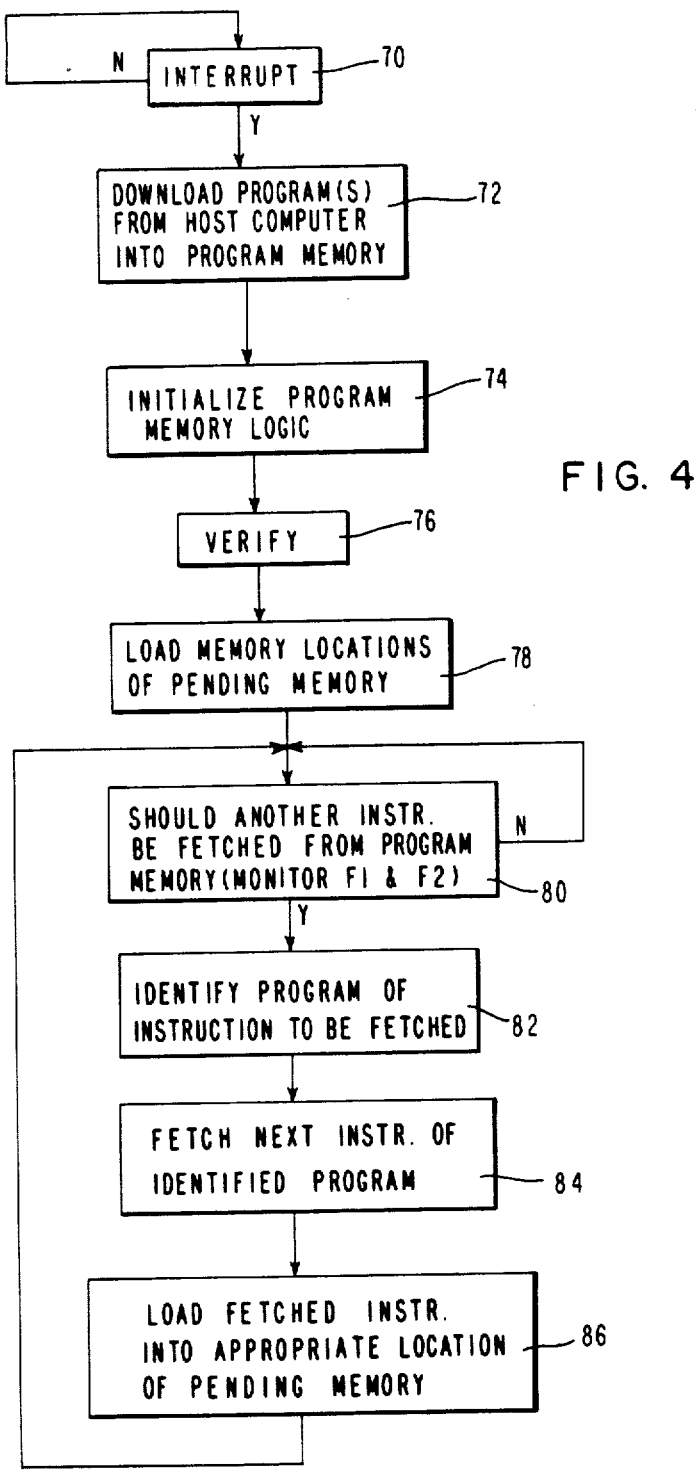
FIGS. 4 and 5 are flow charts exemplifying suitable microprograms for use in the bus control module controllers depicted in the embodiment of FIG. 2.
Figure 5:
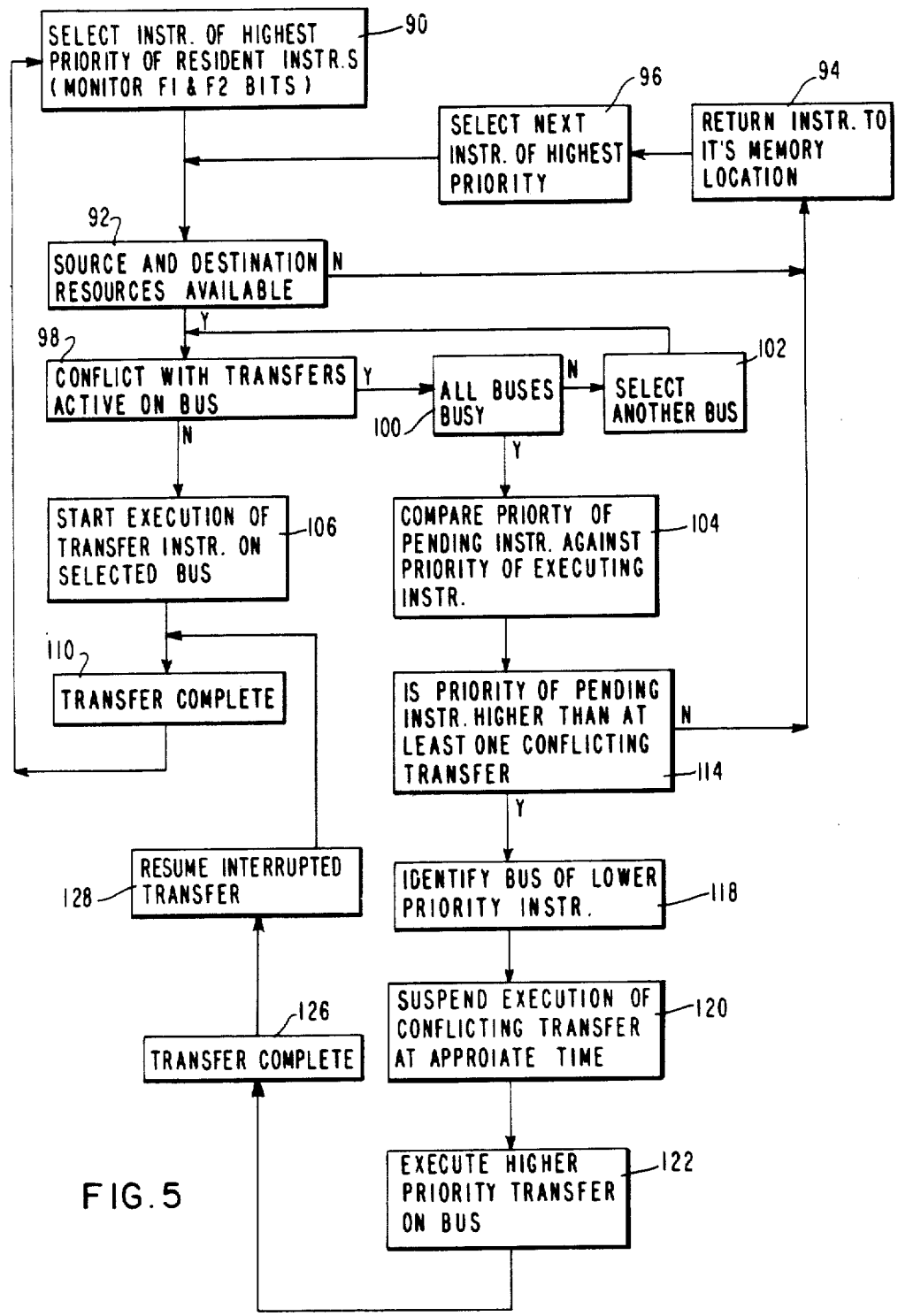

The flow charts of FIGS. 4 and 5 exemplify suitable microprograms for use in the controllers 26 and 24, respectively. A description of a typical operation of the bus control module 12 may be described in connection with the flow charts of FIGS. 4 and 5. Reference to the block diagram of FIG. 2 and the illustration of FIG. 3 will be helpful in following the description of operation here to follow. Referring to FIG. 2, the bus control module 12 may be provided with a communication path between a higher level host computer over a high speed data bus 60. The bus may carry program data and control words for downloading to the program memory 20 over connecting lines 62. In addition, the bus 60 may also carry program initialization data for the sequencer 46 over signal lines 64. The downloading of this program, control, and initialization data may be accomplished in a vectored interrupt mode of control, an example of this being shown in the flow chart of FIG. 4.

Referring to FIG. 4, each time the microprogram of sequencer 46 is interrupted as indicated by the interrupt block 70, programs may be downloaded from the host computer over signal lines 60 and 62 and stored in the program memory 20 as governed by the instructional block 72. Next the initialization data corresponding to the downloaded programs may be provided to the sequencer 46 over signal lines 64 for initializing the program memory logic 48 as governed by the block 74. The sequencer 46 via memory logic 48 may access the downloaded program back to the host computer via signal lines 62 and 60 for verification thereof which may be governed by the instructional block 76. After verification, the controller 26 may load the available memory locations (refer to FIG. 3) of the pending memory 22 with the initial data transfer instructions of the downloaded programs of memory 20 in accordance with the instructional block 78.

In decisional block 80, the sequencer 46 monitors the F1 and F2 codes of the memory 22 to determine if another data transfer instruction should be fetched from the program memory 20. In block 82, the sequencer 46 identifies the program of memory 20 corresponding to the instruction to be fetched and thereafter, fetches the next instruction of the identified program from the memory 20 via memory logic 48 and address lines 50 in accordance with the instructional block 84. Flow chart block 86 governs the replacement of the executed data transfer instruction in memory 22 with the newly fetched instruction from program memory 20.

The foregoing described method steps may be illustrated in connection with the diagrams of FIG. 3. Referring to memory 22, instruction 1D of the first program, IC1, has control bits F1 with a check mark indicating an execution thereof. Thus, sequencer 46 identifies the program of the executed instruction, i.e. PROGRAM 1, and fetches the next instruction thereof, which in the present example is instruction 1F as indicated by the IC1 pointer. Instruction 1D will thereafter be replaced by instruction 1F. In memory 22, instructions 2C and 3H of PROGRAMS 2 and 3, respectively, also have control bits F1 indicating execution. These instructions 2C and 3H will likewise be replaced in the same manner as described hereabove with instructions 2D and 3J, respectively. In this manner, a concurrent execution of the multiple programs of memory 20 is accomplished through the interleaved access of the data transfer instructions thereof to replace the corresponding executed instructions from memory 22. After the fetched instruction is loaded into the appropriate memory location of memory 22, program execution may continue at the flow chart block 80 and the process repeated. The F1 and F2 control codes may be altered in accordance with the sequence of operations being performed.

Referring to the flow chart of FIG. 5 which exemplifies the operation of the controller 24, the sequencer 28 may access the resident instructions of the memory 22 via logic block 30 and address lines 34 to the execute logic block 32 which selects the highest priority resident instruction. This may be accomplished in the flow chart block 90. In flow chart block 92, the execute logic function 32 may determine if the source and destination system modules are available for data transmission. If not, the selected instruction is returned to its memory location in the memory 22 in accordance with the flow chart block 94 and the next instruction of highest priority is selected by the controller 24 in the flow chart block 96 in a similar manner as that described in connection with the block 90.

If the source and destination resources are available, the execute logic 32 determines if there is a conflict with active transfers on a bus by monitoring one of the activity modules, say A1, for example, which may be accomplished with the flow chart block 98. The blocks 100 and 102 permit the controller 24 to monitor the bus activity on all of the other buses sequentially until it is either determined that all buses are busy in which case the program execution continues at block 104 or at least one of the buses will permit the instructed transfer of the selected instruction. In the event that a bus is available, the selected instruction may be transferred from the memory 22 to the bus interface module and bus activity monitor pair corresponding thereto and execution of the transfer instruction may be started in accordance with the flow chart block 106. The controller 24 may continue to monitor the activity of the executing instruction with the flow chart block 110 until the corresponding activity monitor indicates a transfer complete signal. Thereafter, program execution may be continued at the block 90.

In summary, the execute logic function 32 is operative to determine an executable instruction from the accessed instructions provided thereto over signal bus 40 based on the execution priority codes thereof, the source and destination condition signals from the system modules specified thereby, and the current bus activity status as rendered by the bus activity monitors. The controller 24 is operative to select one of the ring buses for the instructed data transfer of the determined executable instruction based on the current bus activity status as rendered by the bus activity monitors. In addition, the controller 24 may transfer the determined executable instruction to the pair of bus interface unit and bus activity monitor corresponding to the selected ring bus.

Now, in the event that all of the ring buses are busy as indicated by the flow chart block 100, the controller 24 may next compare the priority of the pending instruction against the priority of the executing instructions as identified from the information provided thereto by the bus activity monitors A1 through An, for example. This comparison procedure may be accomplished in the flow chart block 104. In flow chart block 114, it may be determined if the priority of the pending instruction is higher than at least one of the conflicting current data transfer instructions. If not, the pending instruction may be returned to memory 22 via block 94 and the data transfer instruction selection procedure may be continued through block 96. If the priority is higher, a ring bus through which a lower priority transfer instruction is being executed may be identified in the flow chart block 118 and the execution of the identified conflicting transfer may be suspended at an appropriate time in accordance with flow chart block 120. The pending higher priority instruction transfer may then be executed on the identified bus through block 122. The controller 24 monitors the bus activity in block 126 until the transfer of the instruction is complete at which time the execution of the interrupted transfer instruction may be resumed according to the flow chart block 128. The activity of this instruction may be monitored until the transfer is complete through block 110 wherein after the selection and execution procedures may be continued starting again at the flow chart block 90. Also, the F1 and F2 control codes may be altered in accordance with the sequence of operations being performed.

In summary, an instruction which would be executable except for a conflict of its instructed data transfer with a current bus activity of all the ring buses is identified. The execution of a selected data transfer is suspended based on the priority codes of its corresponding instruction and the identified instruction. The identified instruction is next executed in place of the selected instruction. The execution of the selected instruction is resumed in accordance with the status of the bus activity as rendered by the bus activity monitor.

Figure 6:
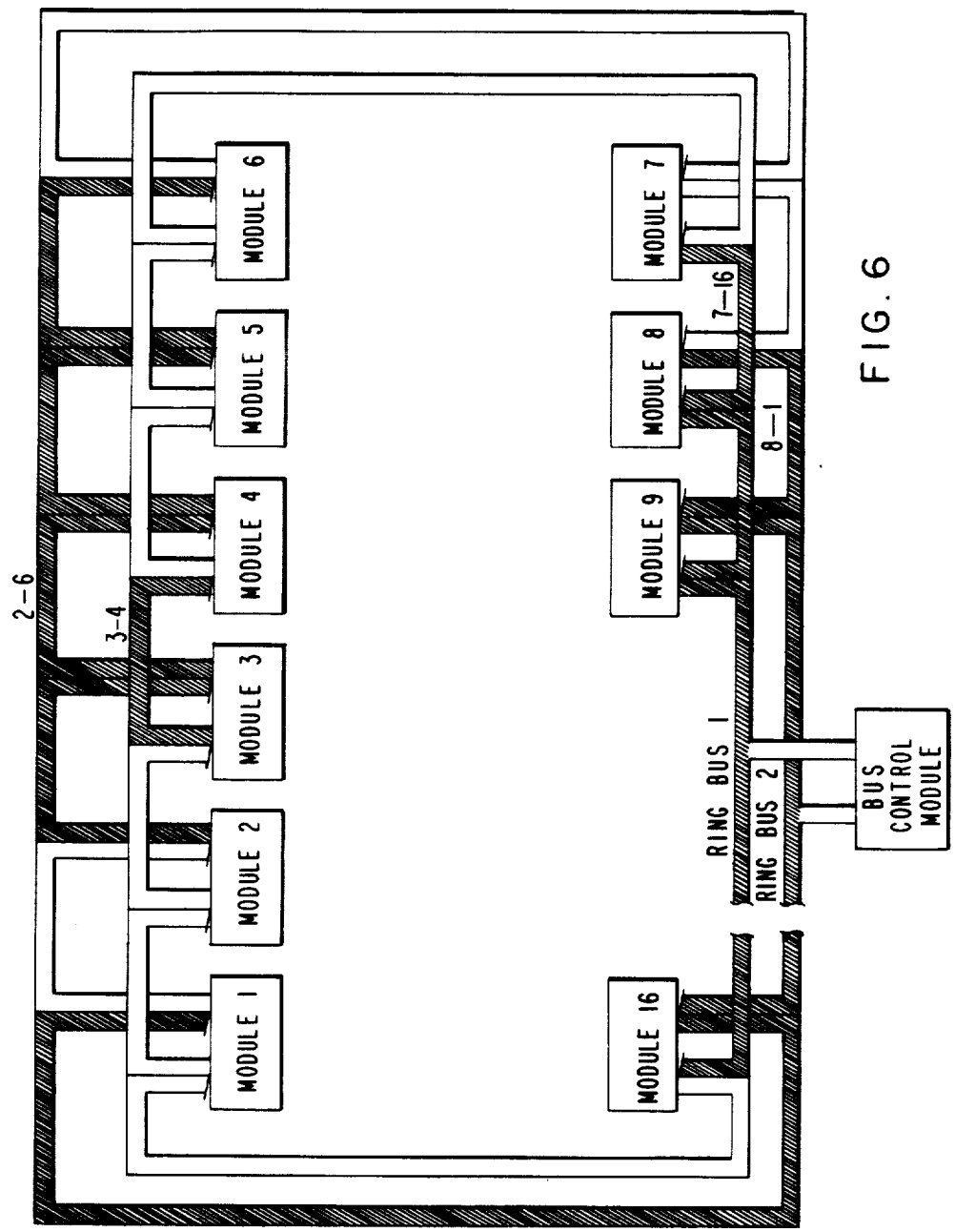
FIG. 6 is a block diagram schematic illustrating the simultaneous transfers on a two-ring bus system of the executable instructions illustrated in the example of FIG. 3.

The above description demonstrates how two independent structures in the bus control module may be used to perform two levels of control, i.e. instruction fetch and instruction execution, which work synergistically to achieve a comprehensive solution to the total bus control problem of multiple programs and modularly expandable bus throughput. To illustrate this more graphically, FIG. 6 is used to complement FIG. 3 by exemplifying the current execution of the multiple programs of memory 20 utilizing the temporary memory 22. FIG. 6 is a block diagram schematic illustrating the simultaneous transfers on a two ring bus system of the executable instructions depicted in the memory 22 of FIG. 3. Note the ring bus 1 supports simultaneously the transfers of instructions 1D and 2C which move data between system modules 7-16 and 3-4, respectively. Similarly, ring bus 2 supports the data transfer of instructions 3H and 3I which move data between modules 2-6 and 8-1, respectively.

Summarizing, the bus control module, which may be embodied as an intermediate level programmable processor, may support data transfers over multiple high frequency ring buses in order to accommodate the high throughput requirements created by a multi-processing environment. The busing structure as well as the bus protocol used are transparent to the programmer. In addition, the bus control module supports the concurrent execution of multiple programs which is desirable because it allows a multi-mode processing system which may be data driven. Moreover, the bus control module may pass addressing and control information to any bulk memory module, which is a global-high density, high speed memory used to store large volumes of data, which may be present in a given system configuration. Accordingly, the combination of aforementioned characteristics permit enough flexibility such that the selected bus bandwidth and processing hardware is maximally utilized.

What is claimed is:

1. A signal processing system including a ring bus; a multiplicity of system modules coupled to said ring bus and operative to receive and transfer blocks of data words over said ring bus; and a bus control module coupled to said ring bus and operative to support simultaneous data transfers between specified pairs of system modules which are available adjacent modules along the ring bus or available modules separated by non-involved modules in accordance with concurrent execution of multiple programs of data transfer instructions, said bus control module comprising:

first memory means for storing a plurality of programs, each program including a sequence of data transfer instructions, each instruction specifying the pair of system modules corresponding to the instructed data transfer thereof;

second memory means for storing a predetermined number of data transfer instructions of each program of said first memory means, each stored instruction of said second memory preassigned an execution priority;

first control means operative to execute the data transfer instructions of said second memory means based on a number of factors including the execution priority of the instruction, a transfer readiness of the pair of system modules specified by the instruction, and a bus activity between said specified module pair; and second control means operative to replace data transfer instructions of said second memory means upon the execution thereof with data transfer instructions of said first memory means fetched from corresponding programs in accordance with the sequence of data transfer instructions thereof.

2. The bus control module in accordance with claim 1 including a bus interfacing means for coupling the bus control module to the ring bus and operative to convert an executable instruction to address and command information specified thereby and to transfer said converted information over the ring bus to the corresponding pair of system modules to initiate data transfer therebetween; and a bus activity monitor for storing instructions during the execution thereof to render the status of the current activity over the ring bus; and wherein the first control means includes means for transferring each executable instruction from the second memory to both said bus interfacing and said bus activity monitor.

3. The signal processing system in accordance with claim 2 wherein each system module includes means for generating signals representative of its source and destination conditions with regard to data transfer readiness; wherein the first control means includes logic means and means for accessing resident instructions from the second memory means to said logic means for evaluation therein, said logic means operative to determine an executable instruction from said accessed instructions based on the execution priority codes thereof, the source and destination condition signals from the system modules specified thereby, and the current bus activity status as rendered by the bus activity monitor; and wherein the first control means including means for transferring said determined executable instruction from said logic means to the bus interfacing means for execution thereof.

4. The bus control module in accordance with claim 1 wherein the second control means includes means for detecting that an instruction of the second memory has been executed; means for determining the program of the executed instruction; and means for accessing the next instruction in sequence of said determined program from the first memory to replace the detected executed instruction of the second memory.

5. The signal processing system in accordance with claim 1 wherein the ring bus comprises individual bus segments for system module to system module coupling about said ring.

6. A signal processing system including a plurality of ring buses; a multiplicity of system modules coupled to each of said ring buses and operative to receive and transfer blocks of data words over said ring buses; and bus control module coupled to each of said ring buses and operative to support simultaneous data transfers between specified pairs of system modules in accordance with concurrent execution of multiple programs of data transfer instructions, said bus control module comprising:

first memory means for storing a plurality of programs, each program including a sequence of data transfer instructions, each instruction specifying the pair of system modules corresponding to the instructed data transfer thereof;

second memory means for storing a predetermined number of data transfer instructions of each program of said first memory means, each stored instruction of said second memory preassigned an execution priority;

first control means operative to execute the data transfer instructions of said second memory means based on a number of factors including the execution priority of the instruction, a transfer readiness of the pair of system modules specified by the instruction, and a bus activity between said specified module pair; and second control means operative to replace data transfer instructions of said second memory means upon the execution thereof with data transfer instructions of said first memory means fetched from corresponding programs in accordance with the sequence of data transfer instructions thereof;

a bus interfacing means for each ring bus of said plurality for coupling the bus control module to each ring bus, each bus interfacing means operative to convert an executable instruction to address and command information specified thereby and to transfer said converted information over its associated ring bus to the corresponding pair of system modules to initiate data transfer therebetween over the associated ring bus; and a bus activity monitor for each ring bus for storing instructions during the execution thereof to render the status of the bus activity over its associated ring bus; and wherein the first control means includes means for transferring an executable instruction to the pair of bus interfacing means and bus activity monitor corresponding to a selected ring bus over which the instructed transfer has been determined to occur.

7. The signal processing system in accordance with claim 6 wherein each system module includes means for generating signals representative of its source and destination conditions with regard to data transfer readiness; wherein the first control means includes logic means and means for accessing resident instructions from the second memory means to said logic means for evaluation therein, said logic means operative to determine an executable instruction from said accessed instructions based on the execution priority codes thereof, the source and destination condition signals from the system modules specified thereby, and the current bus activity status as rendered by the bus activity monitors, and operative to select one of the ring buses for the instructed data transfer of said determined executable instruction based on the current bus activity status as rendered by the bus activity monitors; and wherein the first control means includes means for transferring said determined executable instruction to the pair of bus interfacing means and bus activity monitor corresponding to said selected ring bus.

8. The bus control module in accordance with claim 7 wherein the first control means includes:

means for identifying an instruction which would be executable except for a conflict of its instructed data transfer with the current bus activity of all of the ring buses;

means for suspending execution of a selected data transfer based on the priority codes of its corresponding instruction and said identified instruction, and for executing said identified instruction in place of said selected instruction; and means for resuming execution of said selected instruction in accordance with the status of the bus activity as rendered by the bus activity monitor.

* * * * *